United States Patent
Porter

(10) Patent No.: US 6,578,685 B2
(45) Date of Patent: *Jun. 17, 2003

(54) ACTIVE CONTROL OF A HYDRA-MECHANICAL TRACTION CONTROL DEVICE

(75) Inventor: Fred C. Porter, Beverly Hills, MI (US)

(73) Assignee: New Venture Gear, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/185,908

(22) Filed: Jun. 27, 2002

(65) Prior Publication Data

US 2002/0166746 A1 Nov. 14, 2002

Related U.S. Application Data

(63) Continuation of application No. 09/822,612, filed on Mar. 30, 2001, now Pat. No. 6,446,774.
(60) Provisional application No. 60/195,930, filed on Apr. 10, 2000.

(51) Int. Cl.[7] ............... F16D 25/02; F16D 25/0638; F16D 43/284; F16H 48/30
(52) U.S. Cl. ............. 192/35; 192/82 T; 192/85 AA; 192/103 F; 192/113.3; 192/70.12; 180/197; 180/233
(58) Field of Search ................. 192/35, 32, 85 AA, 192/85 A, 103 F, 82 T, 103 R, 85 R, 70.21, 70.11, 70.12; 475/88, 90, 89, 295, 86, 302, 83, 43, 221, 149, 220, 150, 230, 231, 206, 322, 288, 240; 180/233, 349, 247–250, 197; 701/89, 69, 88, 67; 60/436, 437

(56) References Cited

U.S. PATENT DOCUMENTS

| | | | |
|---|---|---|---|
| 4,773,500 A | | 9/1988 | Naito et al. |
| 4,966,249 A | | 10/1990 | Imaseki |
| 5,148,903 A | * | 9/1992 | Kobayashi et al. ..... 192/85 AA |
| 5,358,454 A | | 10/1994 | Bowen et al. |
| 5,644,916 A | * | 7/1997 | Hayasaki |
| 5,704,863 A | | 1/1998 | Zalewski et al. |
| 5,735,764 A | | 4/1998 | Shaffer et al. |

(List continued on next page.)

Primary Examiner—Douglas C. Butler
(74) Attorney, Agent, or Firm—Harness, Dickey & Pierce P.L.C.

(57) ABSTRACT

The hydraulic coupling includes a multi-plate clutch assembly operatively connecting a pair of rotary members, an actuator assembly for actuating the clutch assembly, and a fluid control system operable for controlling actuation of the actuator assembly including a hydraulic pump and a piston mounted in a piston chamber for movement relative to the multi-plate clutch assembly. The fluid control system regulates the fluid pressure supplied to the piston chamber by the hydraulic pump to control the clutch engagement force exerted by the piston on the clutch assembly. The fluid control system includes an electrically-controlled flow control valve operable for regulating the fluid pressure delivered to the piston chamber. Preferably, the flow control valve is a pulse-width modulated PWM) valve having a moveable valve element. The position of the valve element is controlled by an electronic traction control module that monitors and responds to certain vehicle operating conditions, including a sump fluid temperature, a coupling outlet oil temperature, four wheel speeds, and the piston chamber pressure. The electronic traction control module sends a control signal to the PWM control valve for modulating the hydraulic pressure supplied to the piston chamber, which, in turn, controls clutch engagement.

29 Claims, 3 Drawing Sheets

U.S. PATENT DOCUMENTS

| | | | |
|---|---|---|---|
| 5,803,197 A * | 9/1998 | Hara et al. ................... 180/248 |
| 5,819,194 A | 10/1998 | Hara et al. |
| 5,839,084 A * | 11/1998 | Takasaki et al. |
| 5,875,865 A * | 3/1999 | Wakahara et al. .......... 180/248 |
| 5,927,425 A * | 7/1999 | Kusano ..................... 180/248 |
| 5,967,285 A | 10/1999 | Mohan et al. |
| 6,041,903 A | 3/2000 | Burnes et al. |
| 6,145,644 A * | 11/2000 | Mohan et al. .......... 192/85 AA |
| 6,161,643 A | 12/2000 | Bober et al. |
| 6,176,800 B1 | 1/2001 | Shaffer et al. |
| 6,183,387 B1 | 2/2001 | Yoshioka |
| 6,216,841 B1 | 4/2001 | Hofer |
| 6,315,097 B1 | 11/2001 | Burns |
| 6,334,500 B1 | 1/2002 | Shin |
| 6,354,977 B1 | 3/2002 | Brown et al. |
| 6,360,156 B1 | 3/2002 | Morganroth et al. |
| 6,378,682 B1 | 4/2002 | Mohan et al. |
| 6,381,530 B1 | 4/2002 | Vogt |
| 6,446,774 B2 * | 9/2002 | Porter ......................... 192/35 |
| 6,513,615 B2 * | 2/2003 | Bowen et al. .............. 180/248 |
| 2001/0035323 A1 | 11/2001 | Porter |
| 2002/0142879 A1 * | 10/2002 | Porter ........................ 475/221 |
| 2002/0144851 A1 * | 10/2002 | Porter ........................ 180/247 |

* cited by examiner

ACTIVE CONTROL OF A HYDRA-MECHANICAL TRACTION CONTROL DEVICE

CROSS REFERENCE TO RELATED APPLICATION

This application is a continuation of prior application Ser. No. 09/822,612 filed Mar. 30, 2001, now U.S. Pat. No. 6,446,774 entitled "ACTIVE CONTROL OF A HYDRA-MECHANICAL TRACTION CONTROL DEVICE" which application is herein expressly incorporated by reference. Ser. No. 09/822,612 claims priority for domestic application No. 60/195,930 filed Apr. 10, 2000.

FIELD OF THE INVENTION

The present invention relates generally to couplings for use in motor vehicle driveline applications. More specifically, the coupling includes a hydraulic pump, a transfer clutch coupled between a pair of rotary members, and a fluid distribution system for controlling actuation of the transfer clutch.

BACKGROUND OF THE INVENTION

Hydraulic couplings are used in a variety of motor vehicle driveline applications for limiting slip and transferring drive torque between a pair of rotary members. In all wheel drive applications, hydraulic couplings have been used to automatically control the transfer of drive torque from a driven member to a non-driven member in response to speed differentiation therebetween. In limited slip applications, such as used in association with a differential in an axle assembly, full-time transfer case, or transaxle, hydraulic couplings have been used to limit slip and bias the torque split between two rotary members. Examples of known hydraulic couplings which are adaptable for such driveline applications include viscous couplings, geared traction units, and passively and electronically-controlled hydraulically-actuated friction clutches generally similar to those shown and described in U.S. Pat. Nos. 5,148,900, 5,358,454, 4,649,459, 5,704,863, 5,779,013, and 6,051,903.

In response to increased consumer demand for motor vehicles with traction control systems, hydraulic couplings are currently being used in a variety of driveline applications. Such hydraulic couplings rely on hydromechanics and pressure-sensitive valve elements to passively respond to a limited range of vehicle operating conditions. These hydraulic couplings are susceptible to improvements that enhance their performance, such as a more controlled response to a wider range of vehicle operating conditions. With this in mind, a need exists to develop improved hydraulic couplings that advance the art.

SUMMARY OF THE INVENTION

Accordingly, the present invention provides a hydraulic coupling for use in motor vehicle driveline applications for rotatively coupling a pair of rotary members to limit speed differentiation and transfer drive torque therebetween.

The hydraulic coupling according to the present invention generally includes a multi-plate clutch assembly operatively connecting a pair of rotary members, an actuator assembly for actuating the clutch assembly, and a fluid control system operable for controlling actuation of the actuator assembly. The actuator assembly includes a hydraulic pump and a piston mounted in a piston chamber for movement relative to the multi-plate clutch assembly. The fluid control system regulates the fluid pressure supplied to the piston chamber by the hydraulic pump to control the clutch engagement force exerted by the piston on the clutch assembly. The fluid control system includes an electrically-controlled flow control valve operable for regulating the fluid pressure delivered to the piston chamber. Preferably, the flow control valve is a pulse-width modulated (PWM) valve having a moveable valve element. The position of the valve element is controlled by an electronic traction control module that monitors and responds to certain vehicle operating conditions including, without limitation, a sump fluid temperature, a coupling outlet oil temperature, the four wheel speeds, and the piston chamber pressure. The electronic traction control module sends a control signal to the PWM control valve for modulating the hydraulic pressure supplied to the piston chamber, which, in turn, controls clutch engagement.

BRIEF DESCRIPTION OF THE DRAWINGS

Further objects, features and advantages of the present invention will become readily apparent from the following detailed specification and the appended claims which, in conjunction with drawings, set forth the best mode now contemplated for carrying out the invention. Referring to the drawings:

DETAILED DESCRIPTION OF THE PREFERRED EMBODIMENTS

In general, the present invention is directed to an actively-controlled hydromechanical limited slip and torque transfer apparatus, hereinafter referred to as a hydraulic coupling. The hydraulic coupling is well-suited for vehicular driveline applications requiring torque transfer or slip limiting control between a pair of rotary members. Driveline applications for the hydraulic coupling include, but are not limited to, limited slip axle differentials, power take-offs and in-line coupling for all-wheel drive vehicles, on-demand couplings and limited slip differentials in four-wheel drive transfer cases, and limited slip differentials in transaxles.

Figure 1:
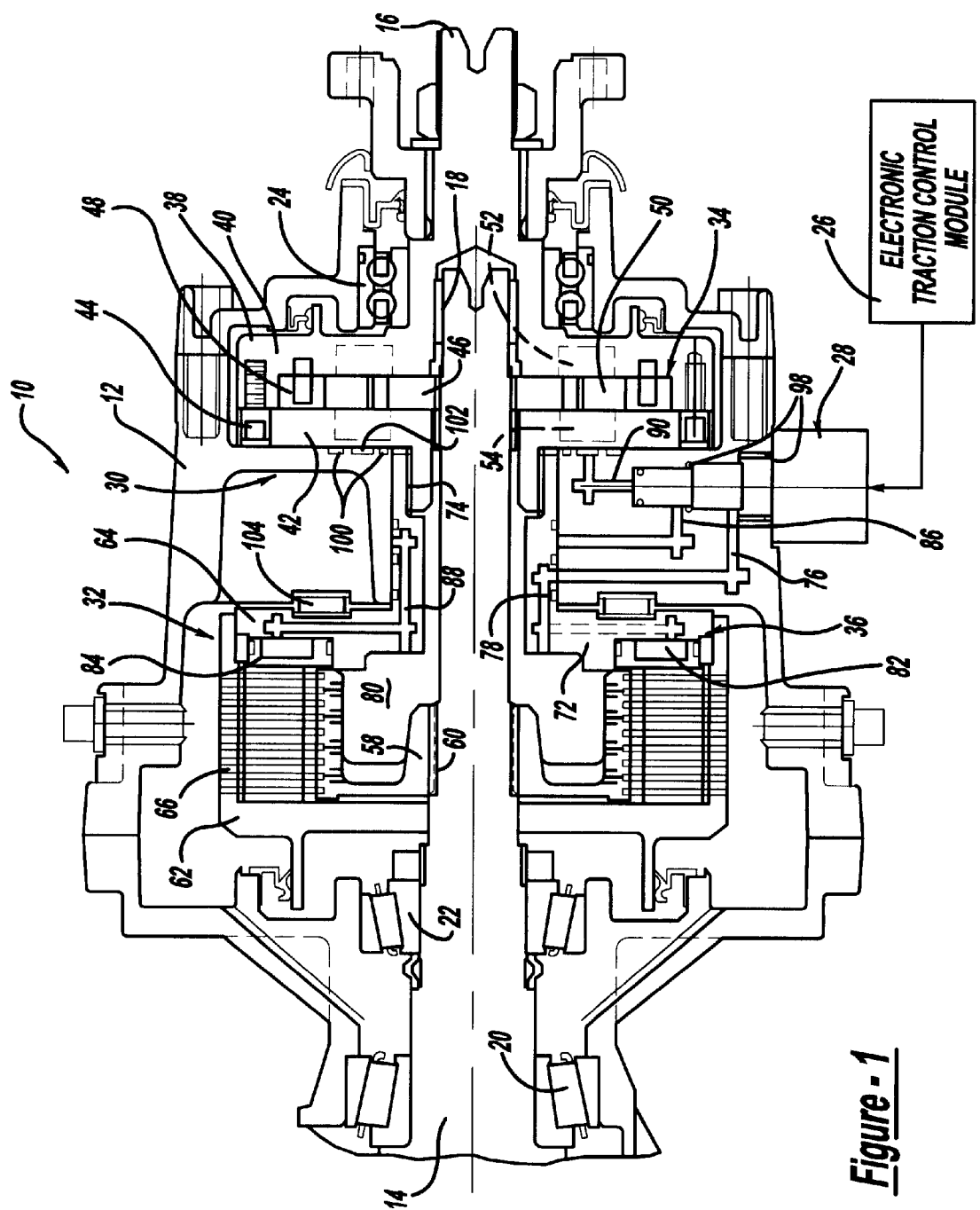
FIG. 1 is a sectional view illustrating a hydraulic coupling according to the present invention operatively coupled between first and second rotary members.

Referring initially to FIG. 1 of the drawings, a hydraulic coupling according to a preferred embodiment of the present invention is generally identified with reference numeral 10. As specifically shown in FIG. 1, hydraulic coupling 10 is located in a driveline apparatus having a housing 12 and is operatively coupled between a first rotary member, hereinafter referred to as first shaft 14, and second rotary member, hereinafter referred to as second shaft 16. Shafts 14 and 16 are rotatable relative to one another, with first shaft 14 being supported by a bearing assembly 18 for rotation relative to second shaft 16. Bearings 20 and 22 and 24 are also provided for supporting shaft 14 and 16, respectively, for rotation relative to housing 12. As will become apparent, hydraulic coupling 10 is controlled by an electronic traction control module 26 for automatically controlling torque transfer and speed differentiation between shafts 14 and 16. Electronic traction control module 26 monitors vehicle system information and hydraulic coupling information including, but not limited to, wheel speed, oil sump temperature, oil outlet temperature, clutch pressure, and controls a pulse-width modulated (PWM) flow control valve assembly 28 associated with hydraulic coupling 10.

In general, hydraulic coupling 10 comprises two portions: an actuator assembly 30, and a transfer clutch 32 for transferring drive torque from a faster rotating shaft to a slower rotating shaft in response to excessive speed differentiation therebetween. Transfer clutch 32 is a hydraulically-actuated multi-plate clutch assembly operably coupled between first shaft 14 and second shaft 16. Actuator assembly 30 includes a hydraulic pump 34 and a piston assembly 36. Hydraulic pump 34 is confined within a cover assembly 38 which includes a cylindrical outer drum 40 and a cover plate 42 secured via fasteners 44 thereto. Cover assembly 38 is fixed for rotation with second shaft 16 and, in the embodiment shown, outer drum 40 is integral with second shaft 16. Preferably, hydraulic pump 34 is a bi-directional gerotor pump having a first toothed pump member 46 fixed (i.e., splined) for rotation with first shaft 14, an eccentric ring 48 fixed to outer drum 40, and a second toothed pump member 50 therebetween. With such an arrangement, relative rotation between first shaft 14 and second shaft 16 results in a pumping action which draws fluid from an inlet chamber 52 on the suction side of pump 34 to an outlet chamber 54 on the discharge side of pump 34. To facilitate pumping action in both directions of rotation, hydraulic pump 34 includes suitable one-way check valves similar to the arrangement shown in commonly-owned U.S. Pat. No. 6,041,903 which is incorporated by reference. Inlet chamber 52 is in fluid communication with fluid-filled sump 56 (FIG. 2) provided within housing 12.

Transfer clutch 32 includes a clutch hub 58 fixed via a splined connection 60 to first shaft 14, an outer drum 62 coupled via a piston housing 64 to cover assembly 38, and a clutch pack 66 having a plurality of inner clutch plates fixed (i.e., splined) to clutch hub 56 that are interleaved with a plurality of outer clutch plates fixed (i.e., splined) to outer drum 62. Outer drum 62 is journaled for rotation relative to first shaft 14. In addition, outer drum 62 is rigidly connected (i.e., welded) to an end plate segment 72 of piston housing 64 which, in turn, is fixed via splined connection 74 to cover plate 42. A first exhaust passage 76 formed in housing 12 communicates with a second exhaust passage 78 in piston housing 64 for exhausting fluid from PWM flow control valve assembly 28 into a clutch chamber 80 to provide an adequate supply of lubricating fluid for cooling and lubricating clutch pack 66.

Piston assembly 36 includes a piston chamber 82 that is formed in plate segment 72 of piston housing 64, and an actuation member or piston 84 disposed in annular piston chamber 82. Piston 84 is supported for axial sliding movement within piston chamber 82 relative to interleaved multi-plate clutch pack 66 for selectively applying a compressive clutch engagement force thereon, thereby transferring drive torque from first shaft 14 (via clutch hub 58) to second shaft 16 (via drum 62, piston housing 64, and cover assembly 38) or vise versa.

A first fluid supply passage 86 is formed in housing 12 between PWM flow control valve assembly 28 and piston chamber 82. First supply passage 86 communicates with a second supply passage 88 formed in piston housing 64. An inlet passage 90 is formed in housing 12 for providing fluid communication between outlet chamber 54 of pump 34 and the inlet to PWM flow control valve assembly 28. A pressure relief valve 92 is provided in inlet passage 90 for preventing the pressure delivered to control valve assembly 28 from exceeding a predetermined maximum level. The amount of drive torque transferred is proportional to the magnitude of the clutch engagement force exerted by piston 84 on clutch pack 66 which, in turn, is a function of the fluid pressure within piston chamber 82. The magnitude of the control fluid pressure ($P_C$) delivered to piston chamber 82 is determined by PWM flow control valve assembly 28 which has a moveable valve element, the position of which is controlled by an electric control signal generated by control module 26. The remaining fluid is exhaust through passages 76 and 78 at an exhaust pressure ($P_E$) which is the difference between the pump pressure $P_G$ generated by gerotor pump 34 and the control pressure $P_C$. As is known, the control pressure $P_C$ can be closely controlled due to the use of PWM valve 28.

As seen, ring seals 98 are provided for sealing piston housing 64 for rotation relative to housing 12. Ring seals 98 allow fluid passages 76 and 86 to communicate between housing 12 and piston housing 64. Moreover, ring seals 100 are provided between cover plate 42 and housing 12 to provide a fluid tight seal therebetween. An annular chamber 102 formed in housing 12 provides fluid communication between outlet chamber 54 and inlet passage 90. A thrust bearing 104 is shown between housing 12 and plate segment 72 of piston housing 64.

It was previously noted that electronic control module 26 monitors vehicle system information and certain hydraulic coupling information including wheel speed, oil sump temperature, the oil outlet temperature, and clutch pressure. In particular, the wheel speeds are detected by four (4) wheel speed sensors 106A–106D which are disposed on, or in close proximity to, each of the vehicles' wheels. The oil sump temperature is measured by a first temperature sensor 106 which is disposed in oil sump 56. The oil outlet temperature is detected by a second temperature sensor 108 located in proximity to the terminal end of second exhaust passage 78. The clutch pressure is detected by a clutch pressure sensor 110 which may be disposed in piston chamber 82 or in one of supply passages 86 and 88.

Figure 2:
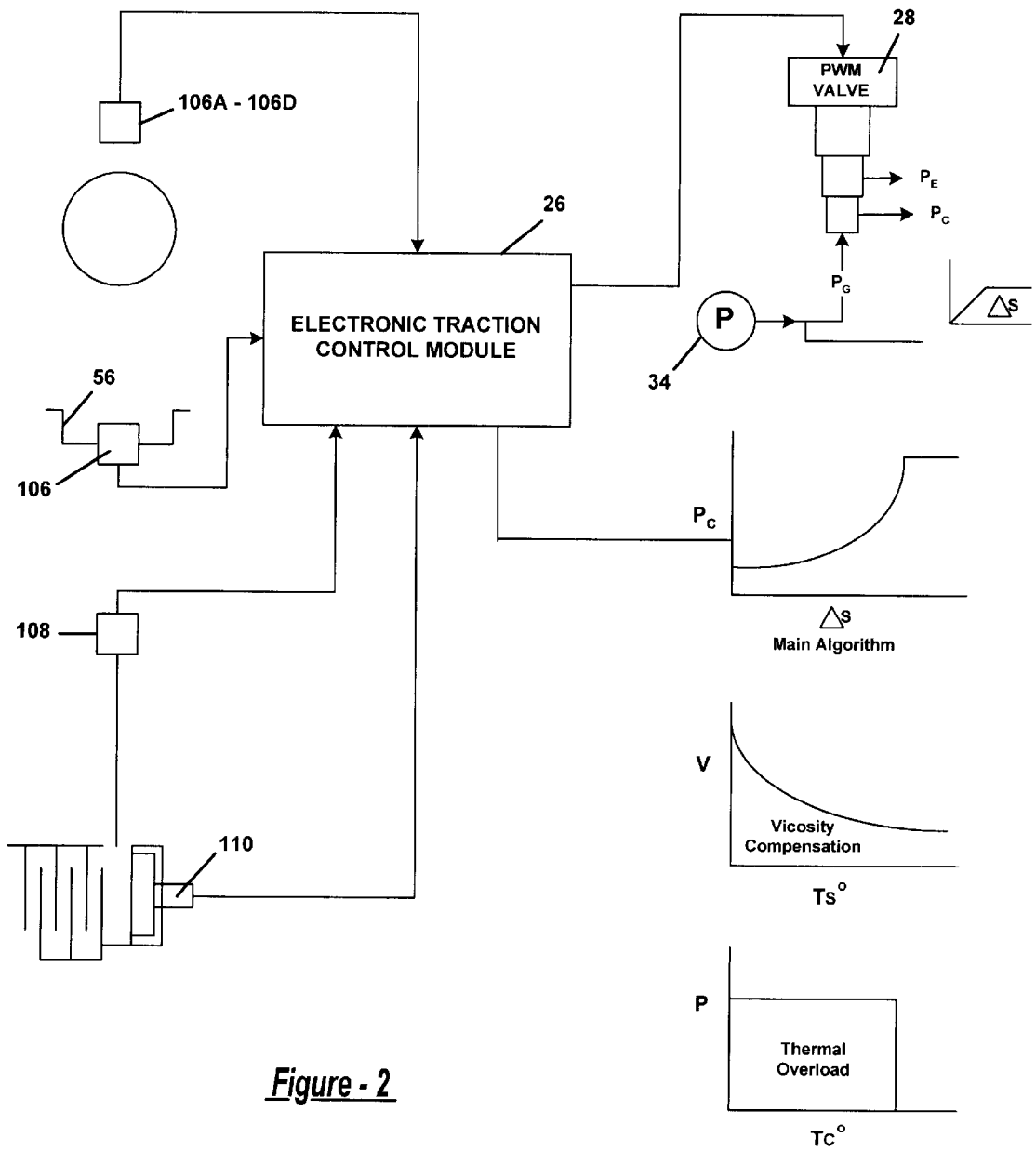
FIG. 2 is a schematic illustration of a hydraulic circuit associated with the hydraulic coupling of FIG. 1.
Figure 3:
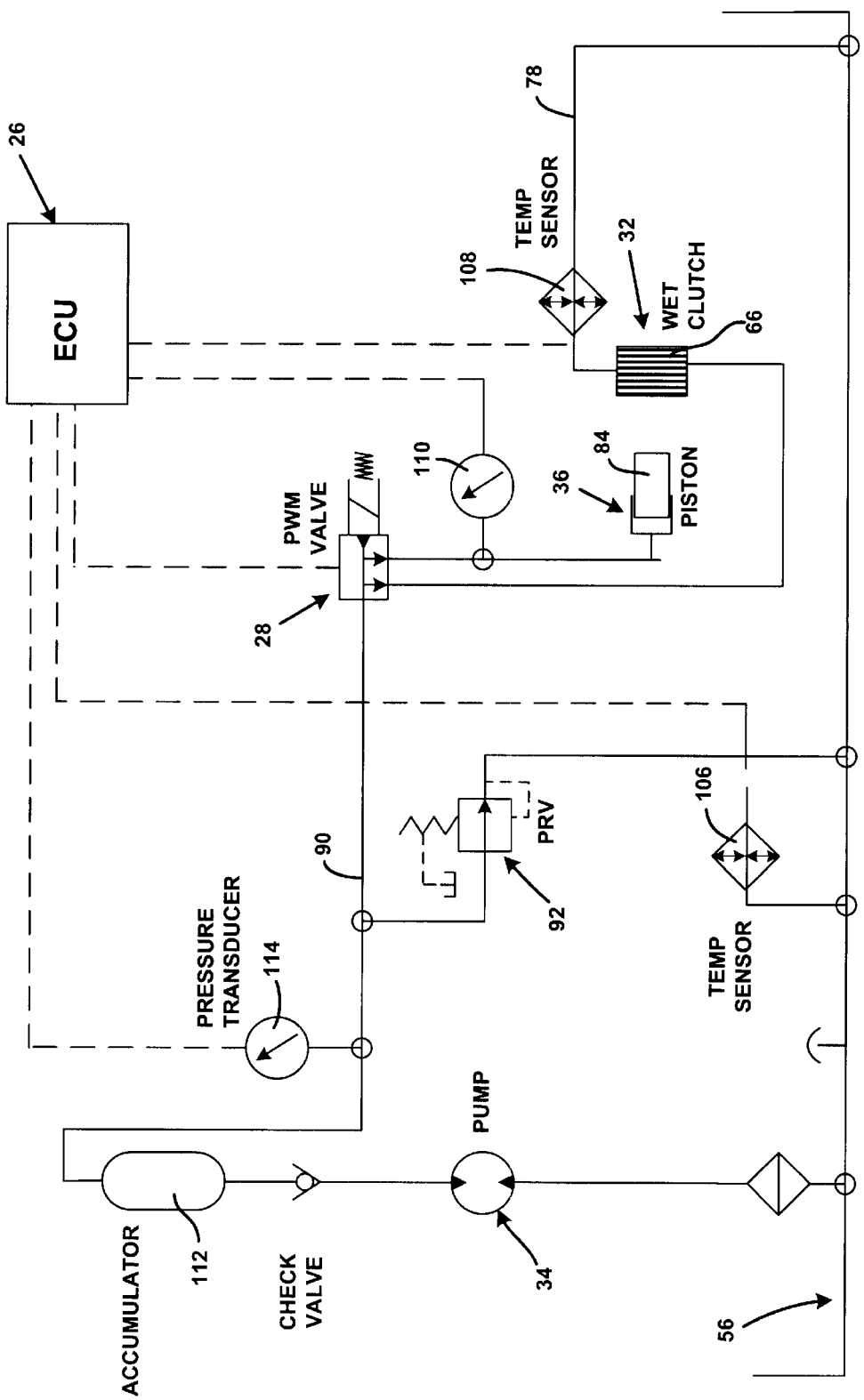
FIG. 3 is a diagramatical illustration of the hydraulic circuit.

The electronic control module 26 employs a main algorithm which determines the desired clutch pressure based upon the difference in front wheel and rear wheel speed ($\Delta_S$). An exemplary characteristic curve for $P_C$ versus $\Delta_S$ is shown in FIG. 2 to illustrate the manner in which the control pressure $P_C$ can be controlled to change with $\Delta_S$. The present invention functions to modulate the clutch apply pressure through the use of PWM solenoid valve 28 with the main algorithm control logic and closed loop control. Lacking any difference in speed between shafts 14 and 16, pump 34 turns as a unit and creates no hydraulic flow. Upon introduction of differential speeds, the pump elements begin relative motion and commence hydraulic flow. The pressure generated by pump 34 is fed to inlet passage 90 for delivery to the inlet of PWM solenoid valve 28. Pulsations in pressure due to gerotor lobes may need to be dampened with an accumulator 112 or other suitable means. The PWM valve duty cycle is controlled electronically by electronic control module 26 based upon the logic of the main algorithm and inputs from wheel speed sensors 104 and 104D (ABS), pressure transducer 110 and temperature sensors 106 and 108. A second pressure transducer 114 can be used to provide a pressure signal to controller 26 from inlet passage 90. The wheel speed sensors are used to control the duty cycle of the PWM valve 28 that, in turn, controls the pressure being fed to piston chamber 82. They also signal controller 26 that a non-standard tire size (mini-spare) is on the vehicle so that the system can be deactivated or operating characteristics can be changed.

Pressure transducer 110 signals controller 26 how much torque is being transferred so that logic can control the torque according to predetermined requirements. It also can be used to limit the maximum torque transfer so that the system components can be down sized for mass and cost savings. Sump temperature sensor 106 is used to compensate for fluid viscosity changes on the inlet side of pump 34. An exemplary viscosity compensation chart is shown in FIG. 2 (labeled "viscosity compensation"). With the fluid viscosity (V) decreasing as the sump fluid temperature ($T_S$) increase. The clutch outlet oil temperature sensor 108 is used to deactivate transfer clutch 32 during thermally abusive operation, thereby preventing clutch damage. An exemplary clutch deactivation curve is shown in FIG. 2 (labeled "thermal overload").

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydraulic coupling for use in a motor vehicle driveline, comprising:
   first and second rotary members;
   a transfer clutch operatively connected between said first and second rotary members;
   a piston disposed in a piston chamber and actuable to engage said transfer clutch;
   a pump cover assembly fixed to said second rotary member;
   a hydraulic pump in fluid communication with a sump containing hydraulic fluid, said hydraulic pump being retained in said pump cover assembly and having a first pump member fixed for rotation with said cover assembly and a second pump member fixed for rotation with said second rotary member such that relative rotation between said first and second pump members generates said pumping action;
   a flow path for supplying said hydraulic fluid from said hydraulic pump to said piston chamber;
   a control valve located in fluid communication with said flow path for regulating the pressure of said hydraulic fluid supplied to said piston chamber;
   a sensor for detecting a physical property of said hydraulic fluid; and
   a traction control module for controlling actuation of said control valve in response to sensor signals from said sensor.

2. The hydraulic coupling of claim 1 wherein said sensor is a temperature sensor for detecting the temperature of said hydraulic fluid in said sump.

3. The hydraulic coupling of claim 2 wherein said temperature sensor generates a temperature signal that is delivered to said control module, and wherein said control module is operable to modified actuation of said control valve in response to variations in said temperature signal.

4. The hydraulic coupling of claim 1 wherein said sensor is a pressure sensor for detecting the pressure of said hydraulic fluid in said piston chamber.

5. The hydraulic coupling of claim 4 wherein said pressure sensor sends a pressure signal to said control module indicative of the fluid pressure in said piston chamber, and wherein said control module is operable to actuate said control valve to limit the pressure of said hydraulic fluid supplied to said piston chamber to a maximum pressure value when said pressure signal exceeds a predetermined threshold value.

6. The hydraulic coupling of claim 1 wherein said sensor is a temperature sensor for detecting the temperature of said hydraulic fluid in said transfer clutch.

7. The hydraulic coupling of claim 6 wherein said temperature sensor generates a temperature signal that is delivered to said control module, and wherein said control module is operable to control said control valve to release said transfer clutch when said temperature signal exceeds a predetermined value.

8. The hydraulic coupling of claim 1 wherein said sensor includes:
   a first sensor for detecting the temperature of said hydraulic fluid in said sump; and
   a second sensor for detecting the pressure of said hydraulic fluid in said piston chamber.

9. The hydraulic coupling of claim 8 wherein said control module is operable to vary actuation of said control valve in response to variations in the value of a temperature signal from said first sensor.

10. The hydraulic coupling of claim 8 wherein said control module is operable to control actuation of said control valve to maintain a maximum fluid pressure in said piston chamber when a pressure signal from said second sensor exceeds a predetermined value.

11. The hydraulic coupling of claim 1 wherein said transfer clutch includes a hub fixed for rotation with said first rotary member, a drum fixed for rotation with said second rotary member, and a multi-plate clutch pack interconnected between said hub and said drum.

12. The hydraulic coupling of claim 1 further comprising first and second speed sensors to measure the rotary speed of said first and second rotary members and send first and second speed signals to said control module, said control module operable to control actuation of said transfer clutch in response to a speed differential between said first and second rotary members.

13. The hydraulic coupling of claim 1, further comprising:
   a secondary flow path supplying hydraulic fluid from said control valve to a clutch chamber to cool said transfer clutch.

14. A hydraulic coupling for use in a motor vehicle to rotatively couple first and second rotary members, the hydraulic coupling comprising:
   a transfer clutch connected between the first and second rotary members;
   a piston disposed in a piston chamber and actuable to engage said transfer clutch for rotatively coupling the first and second rotary members;
   a pump cover assembly that is fixed to the second rotary member;
   a hydraulic pump in fluid communication with a sump containing hydraulic fluid, said hydraulic pump being retained in said pump cover assembly and having a first pump member fixed for rotation with said cover assembly and a second pump member fixed for rotation with the second rotary member such that relative rotation between said first and second pump members generates said pumping action;
   a flow path for supplying hydraulic fluid from said hydraulic pump to said piston chamber;
   a control valve located in fluid communication with said flow path for regulating the fluid pressure supplied to said piston chamber;
   a first sensor for detecting the rotary speed of the first rotary member and generating a first speed signal;
   a second sensor for detecting the rotary speed of the second rotary member and generating a second speed signal; and a control module for controlling actuation of said control valve in response said first and second speed signals.

15. The hydraulic coupling of claim 14 further comprising a temperature sensor for detecting the temperature of said hydraulic fluid in said sump.

16. The hydraulic coupling of claim 15 wherein said temperature sensor generates a temperature signal that is delivered to said control module, said control module having logic for modifying controlled actuation of said control valve in response to variations in said temperature signal.

17. The hydraulic coupling of claim 14 further comprising a temperature sensor for detecting the temperature of said hydraulic fluid in said transfer clutch.

18. The hydraulic coupling of claim 17 wherein said temperature sensor generates a temperature signal that is delivered to said control module, said control module having logic for releasing said transfer clutch when said temperature signal exceeds a predetermined value.

19. The hydraulic coupling of claim 14 further comprising a pressure sensor for detecting the pressure of said hydraulic fluid in said piston chamber.

20. The hydraulic coupling of claim 19 wherein said pressure sensor generates a pressure signal that is delivered to said control module, said control module having logic for limiting the maximum torque transferred by said transfer clutch when said pressure signal exceeds a predetermined value.

21. The hydraulic coupling of claim 14 wherein said transfer clutch includes a hub fixed for rotation with the first rotary member, a drum fixed for rotation with the second rotary member, and a multi-plate clutch pack interconnected between said hub and said drum.

22. The hydraulic coupling of claim 14 wherein said control valve is a pulse-width modulated valve having a moveable valve element.

23. The hydraulic coupling of claim 14, further comprising:
    a secondary flow path supplying hydraulic fluid from said control valve to a clutch chamber to cool said transfer clutch.

24. A hydraulic coupling for use in a motor vehicle to rotatively couple first and second rotary members, the hydraulic coupling comprising:
    a transfer clutch connected between the first and second rotary members and actuable by movement of a piston in a piston chamber;
    a pump cover assembly connectable to the second rotary member;
    a hydraulic pump in fluid communication with a sump containing hydraulic fluid, said hydraulic pump being retained in said pump cover assembly and having a first pump member fixed for rotation with said cover assembly and a second pump member connectable for rotation with the second rotary member such that relative rotation between said first and second pump members generates said pumping action;
    a flow path for supplying hydraulic fluid from said hydraulic pump to said piston chamber;
    a control valve in fluid communication with said flow path for regulating flow of hydraulic fluid into said piston chamber for controlling movement said piston; and
    a traction control system for controlling actuation of said control valve in response to signals from sensors which detect at least two different operating conditions of said hydraulic coupling.

25. The hydraulic coupling of claim 24 wherein the said traction control system receives signals from at least two sensors from a group comprised of a first temperature sensor for detecting the temperature of hydraulic fluid in said sump, a second temperature sensor for detecting the temperature of hydraulic fluid in said transfer clutch, and a pressure sensor for detecting the pressure of fluid in said piston chamber.

26. The hydraulic coupling of claim 25 wherein said control module includes logic for modifying controlled actuation of said control valve in response to variations in temperature signals from said first temperature sensor indicative of fluid viscosity changes.

27. The hydraulic coupling of claim 26 wherein said control module further includes logic for releasing said transfer clutch in response to a temperature signal from said second temperature sensor which exceeds a predetermined maximum value.

28. The hydraulic coupling of claim 27 wherein said control module further includes logic for limiting the maximum torque transferred by said transfer clutch in response to a pressure signal from said pressure sensor exceeding a predetermined maximum value.

29. The hydraulic coupling of claim 24, further comprising:
    a secondary flow path supplying hydraulic fluid from said control valve to a clutch chamber to cool said transfer clutch.

* * * * *